United States Patent [19]

Bennett

[11] 3,836,812

[45] Sept. 17, 1974

[54] DISPLAY OF DIGITALLY STORED IMAGE ON A SPHERICAL VIEWING SURFACE

[75] Inventor: William S. Bennett, Chenango Bridge, N.Y.

[73] Assignee: The Singer Company, New York, N.Y.

[22] Filed: Jan. 22, 1973

[21] Appl. No.: 325,573

[52] U.S. Cl. ................ 315/18, 178/DIG. 35, 178/68

[51] Int. Cl. ............................................ H01j 29/70

[58] Field of Search.... 315/18, 22; 178/6.8, DIG. 6, 178/DIG. 35, 7.88; 350/29

[56] References Cited

UNITED STATES PATENTS

| | | | |
|---|---|---|---|
| 3,580,978 | 5/1971 | Ebeling | 178/DIG. 35 |
| 3,692,934 | 9/1972 | Herndon | 178/DIG. 35 |
| 3,697,681 | 10/1972 | McCoy | 176/6.8 |

*Primary Examiner*—Maynard R. Wilbur
*Assistant Examiner*—J. M. Potenza
*Attorney, Agent, or Firm*—James C. Kesterson; Leonard Weiss

[57] ABSTRACT

In response to timing signals, a first read-only memory provides elevation signals to a display having a spherical viewing surface. The timing signals and the output of the first read only memory are additionally provided to a second and a third read only memory which respectively provide azimuth signals to the display and input signals to a digital image generator. In response to the elevation and azimuth signals, a beam provides a raster of great circles on the viewing surface. The timing signals are additionally provided to the digital image generator which provides to the display a representation of a stored image which is viewed in a desired perspective from an eyepoint.

8 Claims, 8 Drawing Figures

DISPLAY OF DIGITALLY STORED IMAGE ON A SPHERICAL VIEWING SURFACE

BACKGROUND OF THE INVENTION

1. Field of the Invention

This invention relates to cathode ray tube displays and more particularly to apparatus for displaying an image stored in a digital image generator on a curvilinear viewing surface.

2. Description of the Prior Art

In displaying an image on the face of a cathode ray tube (CRT), typically the beam thereof is deflected to trace an array of evenly-spaced horizontal lines from left to right across the face. The array of lines is referred to in the art as a raster.

The first line of the raster is usually traced across the top of the face. Thereafter, during a horizontal retrace time, the beam is rapidly deflected to the left hand side of the face to a point slightly lower than the start of the first line, and the succeeding line is traced. After the lowest line is traced, the beam is deflected during a vertical retrace time to the upper left hand side of the face, and the first line of another raster is traced.

Usually, the CRT is biased below cutoff during the retrace times thereby preventing the trace of the beam from appearing. An image is displayed upon the face by either varying the intensity or the color of the trace of the beam.

In a plethora of display systems, it is desirable to display an image which is stored in a digital image generator. As is known to those skilled in the art, a digital image generator provides a representation of a video signal in response to signals representative of a position of a beam on a raster line. The digitally stored image is displayed in response to the video signals that are provided as a raster is traced by the beam. In most digital image generators, the video representation only provides an undistorted image on a CRT with a flat face.

In a display system for a flight simulator, for example, it is desirable to display a collimated image which simulates a view from the cockpit of an aircraft. The collimated image is typically displayed on a curvilinear viewing surface of the type disclosed by McGlasson in U.S. Pat. No. 3,659,920 and McCoy in U.S. Pat. No. 3,697,681.

Typically, when the digitally stored image is displayed, a raster line is traced by a beam at a rate which is varied to compensate for the curvature of the viewing surface. However, a variable tracing rate of the beam causes variations of intensity which degrade the simulation. Heretofore, only very complex apparatus has provided a display of the digitally stored image on the curvilinear viewing surface whereon the beam is deflected at a constant rate.

SUMMARY OF THE INVENTION

The object of the present invention is to display a digitally stored image on a curvilinear viewing surface.

According to the present invention, a pair of counters respectively provide displacement and line signals in response to a clock pulse; a first read only memory provides an elevation signal in response to said line signal a second read only memory provides an azimuth signal in response to said displacement and elevation signals, and a third read only memory provides an image point signal in response to said displacement and elevation signals a beam on said viewing surface is deflected to a display point in response to said elevation and azimuth signals and a digital image generator causes said beam to provide an image point on a digitally stored image in response to said image point and line signals.

Apparatus according to the present invention utilizes read only memories for providing a digitally stored image on a viewing surface whereby the apparatus is inexpensive, simple and more reliable than digital image generation apparatus known heretofore.

Other objects, features and advantages of the present invention will become more apparent in the light of the following description of a preferred embodiment thereof as illustrated in the accompanying drawing.

DESCRIPTION OF THE PREFERRED EMBODIMENT

In the preferred embodiment, lines of a raster are traced by a beam on a sperical viewing surface of the type disclosed in the patents of McGlasson and McCoy referred to hereinbefore. An image displayed on the viewing surface is viewed from the center of curvature thereof at an eyepoint.

Figure 1:
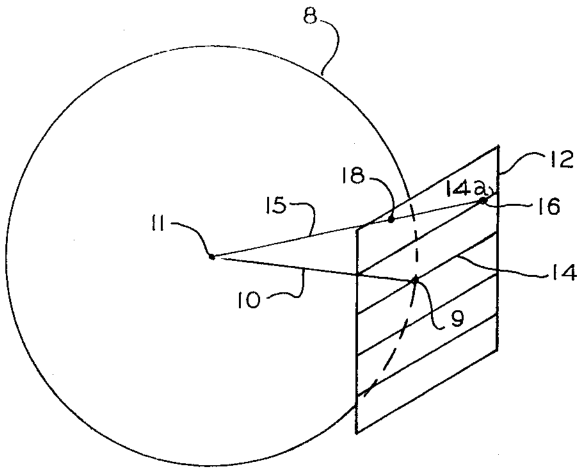
FIG. 1 is a schematic view of a spherical viewing surface and a digitally stored image.

Referring now to FIG. 1, a spherical viewing surface 8 has a tangent point 9 from which a radius 10 extends to an eyepoint 11 (at the center of curvature of the viewing surface 8). A representation of an image stored in a digital image generator is provided within a planar image surface 12 which contains an image line 14 which is tangent to the viewing surface 8 at the tangent point 9. Points on the image line 14 are representative of points along a line of the stored image.

A line of sight 15 from the eyepoint 11 passes through the viewing surface 8 at a display point 18 to an image point 16 on an image line 14*a* which is parallel to the image line 14. A display representing the image point 16 is viewed in a desired perspective at the display point 18. When the line of sight 15 successively passes through the viewing surface 8 to each of the image points on the image line 14*a*, a great circle is defined by intersected display points whereby a display representative of the line 14*a* is provided in the desired perspective. Therefore, image points (on an image line) respectively correspond to display points (on the viewing surface 8).

Figure 2:
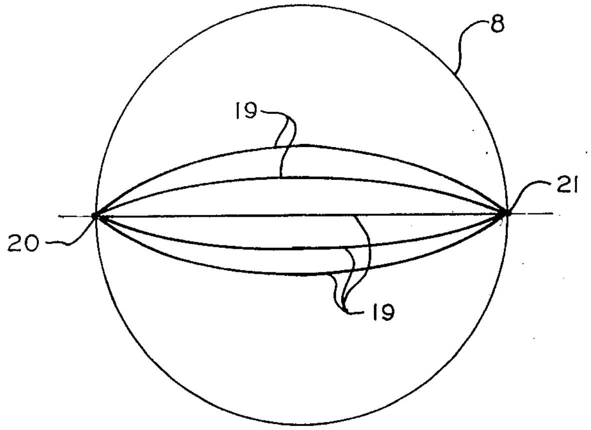
FIG. 2 is a schematic view of the spherical viewing surface of FIG. 1 with great circle raster lines thereon.

Referring now to FIG. 2, when equally spaced lines are represented on the image surface 8, they define a family of great circles 19 which all intersect at polar points 20, 21. Therefore, equally spaced image lines respectively correspond to a raster of great circles.

On the viewing surface 8 the beam traces the great circles 19 thereby providing a raster. The great circles are traced at a constant rate with a color of the beam being provided at display points in accordance with respectively corresponding image points whereby the stored image is displayed in the desired perspective.

The present invention is predicated upon three read only memory relationships which are associated with the trigonometric relationship of an image point to a display point. Accordingly, an explanation of the three read only memory relationships is provided hereinafter.

Figure 3:
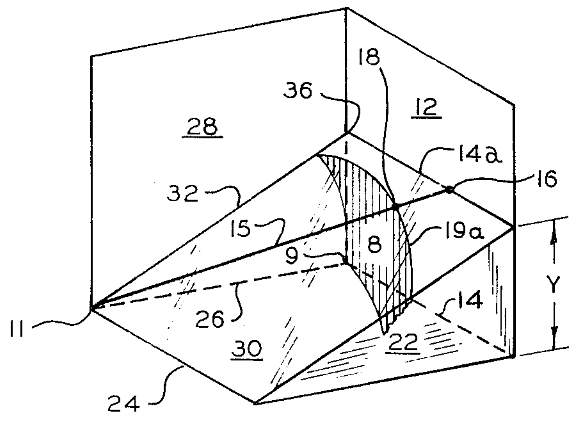
FIG. 3 is a perspective view of a portion of the spherical viewing surface of FIG. 1, intersecting planes associated therewith and an image plane.

Referring now to FIG. 3, a great circle 19*a* is defined on the viewing surface 8 by the line of sight 15 successively passing through the image points on the image line 14*a* as described hereinbefore.

An equatorial plane 22 includes a radius 24 perpendicular to a radius 26 which connects the tangent point 9 to the eyepoint 11. The radius 26 is also included in a central vertical plane 28 which is perpendicular to the surface 12 and the plane 22. A slant plane 30, which is perpendicular to the plane 28, includes the image lines 14*a* and the radius 24.

Figure 3A:
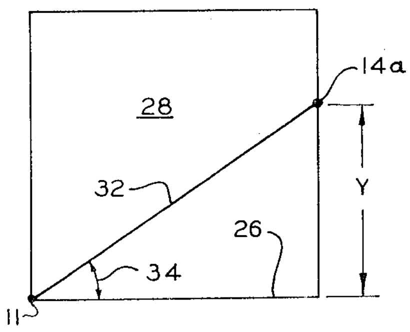
FIG. 3*a* is a plan view of the central vertical plane of FIG. 3.

Referring now to FIG. 3*a*, the plane 28 is intersected by the plane 30 (FIG. 3) along an intersection line 32. The line 32 and the radius 26 subtend an image line elevation angle 34. According to the present invention, the displacement of the image line 14*a* above the radius 26 (and the equatorial plane 22) is related by a first read only memory relationship to the length of the radius 26 and the elevation angle 34. The first read only memory relationship is given as:

$y = r \tan \phi$, which may be rewritten as:

$\phi = \arctan (y/r)$ where $r$ is the length of the radius 26;

$\phi$ is the elevation angle 34; and $y$ is the displacement of the image line 14*a* above the equatorial plane 22.

The length of the line 32 is provided in accordance with a first trigonometric relationship which is given as:

$$Z = r/\cos \phi$$

where Z is the length of the line 32.

Figure 3B:
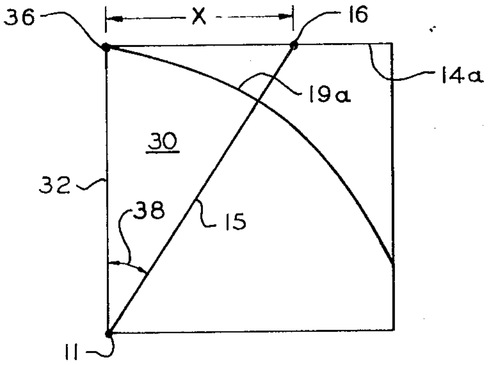
FIG. 3*b* is a plan view of the slant plane of FIG. 3.

Referring now to FIG. 3*b*, the line of sight 15 and the line 32 subtend an angle 38 and the line 32 intersects the image line 14*a* at an intersection point 36. The displacement of the image point 16 from the point 36 is in accordance with a second trigonometric relationship which is given as:

$$x = z \tan \Theta$$

where $\Theta$ is the angle 38; and $x$ is the displacement of the image point 16 from the point 36.

The line 32 and the line of sight 15 have therebetween an arc of the great circle 19*a* which has a length in accordance with a third trigonometric relationship which is given as:

$s = r\,\Theta$, which may be rewritten as:

$$\Theta = s/r$$

where $s$ is the length of an arc of the great circle 19*a* from the intersection line 32 to the line of sight 15.

Figure 3C:
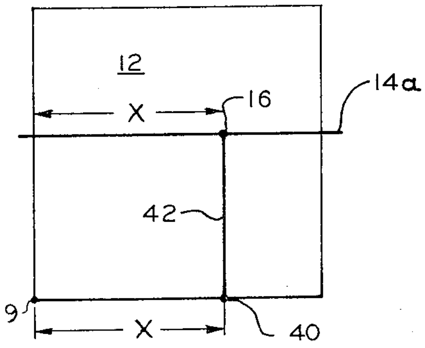
FIG. 3*c* is a plan view of the image surface of FIG. 3.

Referring now to FIG. 3*c*, within the image surface 12 at the intersection therewith of the equatorial plane 22, an image point 40 is defined on a construction line 42 which is perpendicular to the image line 14*a* and passing through the image point 16.

Figure 3D:
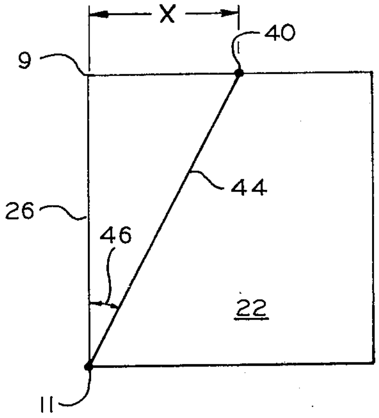
FIG. 3*d* is a plan view of the equitorial plane of FIG. 3.

Referring now to FIG. 3*d*, within the equitorial plane 22 a line 44 connects the point 40 to the eyepoint 11. An azimuth image angle 46 is subtended by the line 44 and the radius 26 in accordance with a fourth trigonometric relationship which is given as:

$$\alpha = \arctan (x/r)$$

where $\alpha$ is the azimuth angle 46.

It should be understood that the elevation angle 34 and the azimuth angle 46 collectively identify a line of sight from the eyepoint 11 through a display point to an image point.

Applying well known algebra, the expression, z tan $\Theta$, of the second trigonometric relationship may be substituted into a fourth trigonometric relationship thereby providing a first intermediate relationship which is given as:

$$\alpha = \arctan (z \tan \Theta/r)$$

The expression, $s/r$, of the third trigonometric relationship may be substituted into the first intermediate relationship thereby providing a second intermediate relationship which is given as:

$$\alpha = \arctan (z \tan (s/r)\ /r)$$

The expression, $r/\cos \Theta$, of the second trigonometric relationship may be substituted into the second intermediate relationship thereby providing a second read only memory relationship. According to the present invention, the second read only memory relationship is given as:

$$\alpha = \arctan (\tan s/r/\cos \phi)$$

The expression, $r/\cos \phi$, of the first trigonometric relationship and the expression, $s/r$, of the third trigonometric relationship may both be substituted into the second trigonometric thereby providing a third read only memory relationship. According to the present invention, the third read only memory relationship is given as:

$$x = r \tan (s/r)/\cos \phi$$

Figure 4:
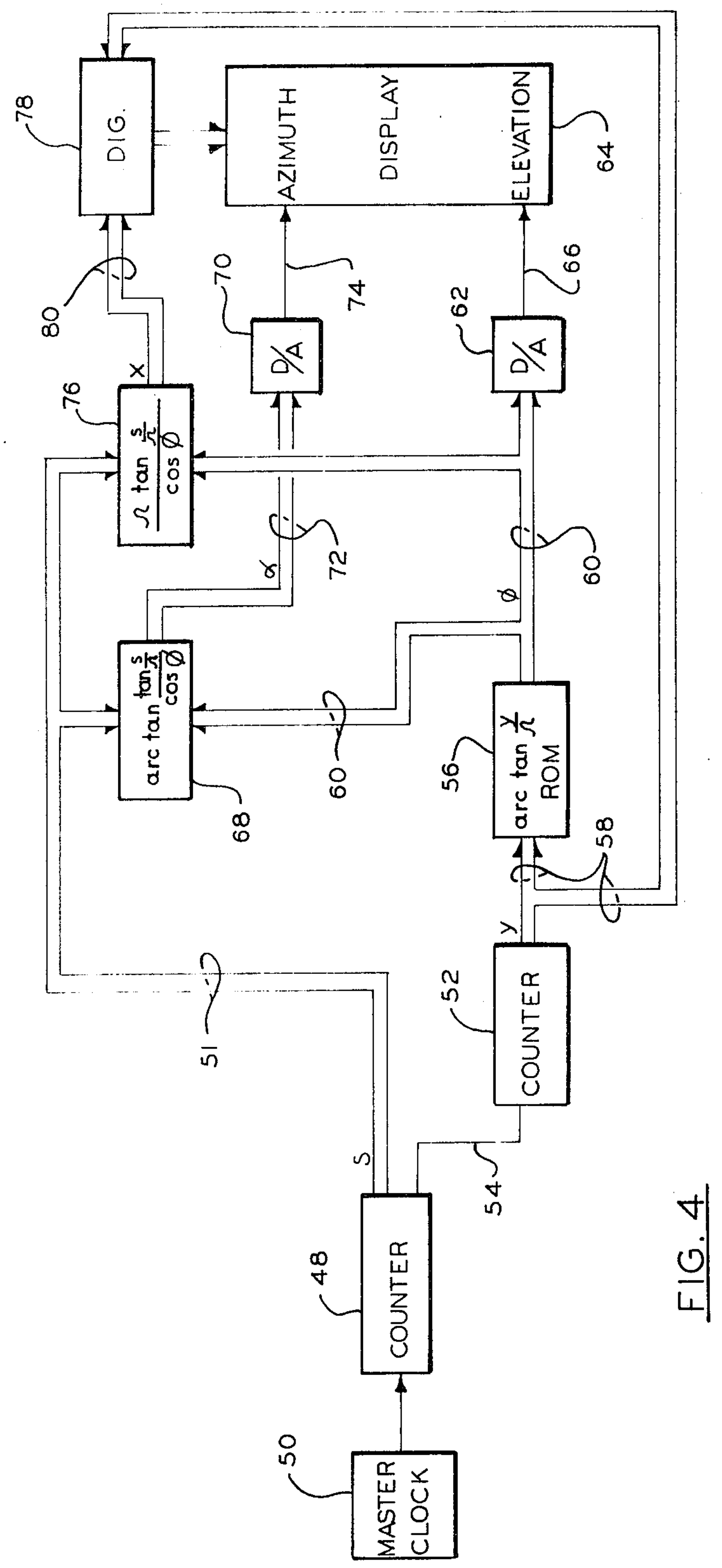
FIG. 4 is a block diagram of a preferred embodiment of the present invention.

Referring now to FIG. 4, in providing a representation of a displacement along an arc of a great circle raster line, an image point counter 48 has an input connected to a master clock 50 which provides clock pulses at a constant rate. The counter 48 is a well known type which provides two outputs, one of which is a digital signal representation of the cumulative number of clock pulses provided on a plurality of signal lines 51. In a digital signal representation, either one of two voltages (known as logic levels) are provided on each of a plurality of signal lines. Since the clock pulses are provided at a constant rate, the rate of change of the cumulative number of pulses is constant whereby the counter 48 provides a digital displacement output which is representative of a displacement along an arc of a great circle raster line traced by the beam at a constant rate on the viewing surface 8. The displacement is from the intersection line 32 to the line of sight 15 (FIG. 3*b*).

The other output of the counter 48 is a line pulse provided in response to a clock pulse occurring when the digital displacement output is indicative of the end of a raster line. Concurrently with providing the line pulse, the counter 48 is reset to provide a digital displacement output representative of the start of a raster line.

The line pulses are provided to a line counter 52, similar to the counter 48, which is connected thereto through a signal line 54. The counter 52 provides a line output which is a digital representation of the cumulative number of line pulses which, in this embodiment, is representative of the displacement of an image line from the equatorial plane 22 (FIG. 3*a*). After completing the tracing of a raster, a successive line pulse causes the counter 52 to reset and thereby provide a line output representative of the displacement of a first image line (corresponding to a first raster line).

The output of the counter 52 is connected to a first read only memory 56 through a plurality of signal lines 58. The read only memory 56 is a decoding apparatus, such as a diode matrix, which is constructed to respond to the line output in accordance with the first read only memory relationship. Therefore, the read only memory 56 provides a digital elevation output which is a digital signal representation of the elevation angle 34 (FIG. 3*a*).

The output of the read only memory 56 is connected to a digital-to-analog converter 62 through a plurality of signal lines 60. The digital-to-analog converter 62 provides an elevation signal having an amplitude in accordance with the digital elevation output whereby the elvation signal has an amplitude proportional to the elevation angle 34.

The output of the digital-to-analog converter 62 is connected to a display 64 at an elevation input thereof through a signal line 66. The display 64 includes the viewing surface 8 whereby the beam thereof is vertically deflected to a raster line in accordance with the first read only memory relationship.

The counter 48 and the read only memory 56 are respectively connected to a second read only memory through the signal lines 51, 60, respectively. The read only memory 68 is constructed to respond to the concurrent provision of the digital displacement and digital elevation outputs in accordance with the second read only memory relationship. Therefore, the read only memory 68 provides a digital azimuth output which is a digital signal representation of the azimuth angle 46 (FIG. 3d).

The output of the read only memory 68 is connected to a digital-to-analog converter 70 (similar to the digital-to-analog converter 62) through a plurality of signal lines 72. The digital-to-analog converter 70 provides an azimuth signal having an amplitude in accordance with the digital azimuth ouput whereby the azimuth signal has an amplitude proportional to the azimuth angle 46.

The output of the digital-to-analog converter 70 is connected to an azimuth input of the display 64 through a signal line 74 whereby the beam of the viewing surface 8 is deflected along a raster line in accordance with the second read only memory relationship.

The counter 48 and the read only memory 56 are respectively connected to a third read only memory 76 through the signal lines 51, 60, respectively. The read only memory 76 is constructed to respond to the concurrent provision of the digital displacement and digital elevation outputs in accordance with the third read only memory relationship. Therefore, the read only memory 76 provides an image point output which is a digital signal representation of the displacement of an image point along an image line (FIG. 3*b*).

The counter 52 and the read only memory 76 are respectively connected to a digital image generator 78 through lines 58 and the signal lines 80, respectively. The digital image generator is constructed to respond to the concurrent provision of the image point and line outputs by providing a signal representation of a desired color. The output of the digital image generator 78 is connected to the display 64 through signal lines 80 whereby the digitally stored image is displayed on the viewing surface 8.

It should be understood that the display 64 may include apparatus for correcting geometry distortion associated therewith. Apparatus such as disclosed in U.S. Pat. No. 3,422,306, or any other suitable apparatus may be utilized for correcting the geometry distortion.

Thus there has been shown apparatus for displaying a digitally stored image on a curvilinear viewing surface.

Although the invention has been shown and described with respect to a preferred embodiment thereof, it should be understood by those skilled in the art that various changes and omissions in the form and detail thereof may be made therein without departing from the spirit and the scope of the invention.

Having thus described a typical embodiment of my invention, that which I claim as new and desire to secure by letters patent of the United States is:

1. Apparatus for displaying a stored digital image on a spherical viewing surface, wherein stored image points of said image are represented as if located within a planar image surface tangent to said spherical viewing surface, comprising:

timing means for providing pulse output signals at a constant rate;

first memory means connected to said timing means and responsive to said pulse output signals for providing a deflection control signal;

deflection means responsive to said deflection control signal for deflecting an energy beam such that display points on said spherical viewing surface are scanned at a constant rate;

second memory means responsive to said deflection control signal for providing an image point control signal representative of the location of an image point within said planar image surface intersected by a line of sight from a selected view point, said line of sight simultaneously intersecting a corresponding display point on said spherical viewing surface which is representative of the position to which said energy beam has been deflected; and digital means responsive to said image point control signal for providing information concerning said image to said energy beam such that said display points on said spherical viewing surface display said information.

2. The apparatus of claim 1 wherein said timing means provide a first pulse output signal at a constant rate and a second pulse output signal having pulses which occur at a selected multiple of the pulses of said first pulse output signal and wherein said first memory means comprises:

elevation memory means responsive to said second pulse output signal for providing an elevation deflection control signal having an amplitude, $\phi$, which varies in accordance with a first selected relationship; and azimuth memory means responsive to said elevation deflection control signal and said first pulse output signal for providing an azimuth deflection signal having an amplitude, $\alpha$, which varies in accordance with a second selected relationship.

3. The apparatus of claim 2 wherein a great circle of said spherical viewing surface lies in an equatorial plane which passes through the point at which said planar image surface is tangent to said spherical viewing surface; said stored image points are further represented as lying along an image line within said planar surface and parallel to said equatorial plane; said first selected relationship is given as $$\phi = \tan y/r$$

where $y$ is the displacement of said image line from said equatorial plane, and $r$ is the radius of said spherical viewing surface; and said second selected relationship is given as $$\alpha = \text{arc tan tan } (s/r)/\cos \phi$$

where $s$ is the displacement along said great circle.

4. The apparatus of claim 3 wherein said digital means are additionally responsive to said second pulse output signal; said second memory means are responsive to said elevation deflection control signal and said first pulse output signal; and said image point control signal is representative of the displacement of said image point from said tangent point along an image line, said image point displacement, $x$, varying according to the relationship $$x = r(\tan (s/r)/\cos \phi).$$

5. Apparatus according to claim 2 wherein said elevation memory means comprises a read only memory.

6. Apparatus according to claim 2 wherein said azimuth memory means comprises a read only memory.

7. Apparatus according to claim 2 wherein said timing means comprise:

a source of timing signals provided at a substantially constant rate; and a pair of timing signal counters connected to said timing source one of said counters providing said first pulse output signal and the other one of said counters providing said second pulse output signal.

8. Apparatus according to claim 1 wherein said second memory means comprises a read only memory.

* * * * *